March 27, 1951 G. PACURAR 2,546,610
SWITCH SIGNALING MEANS
Filed June 19, 1948 2 Sheets-Sheet 1
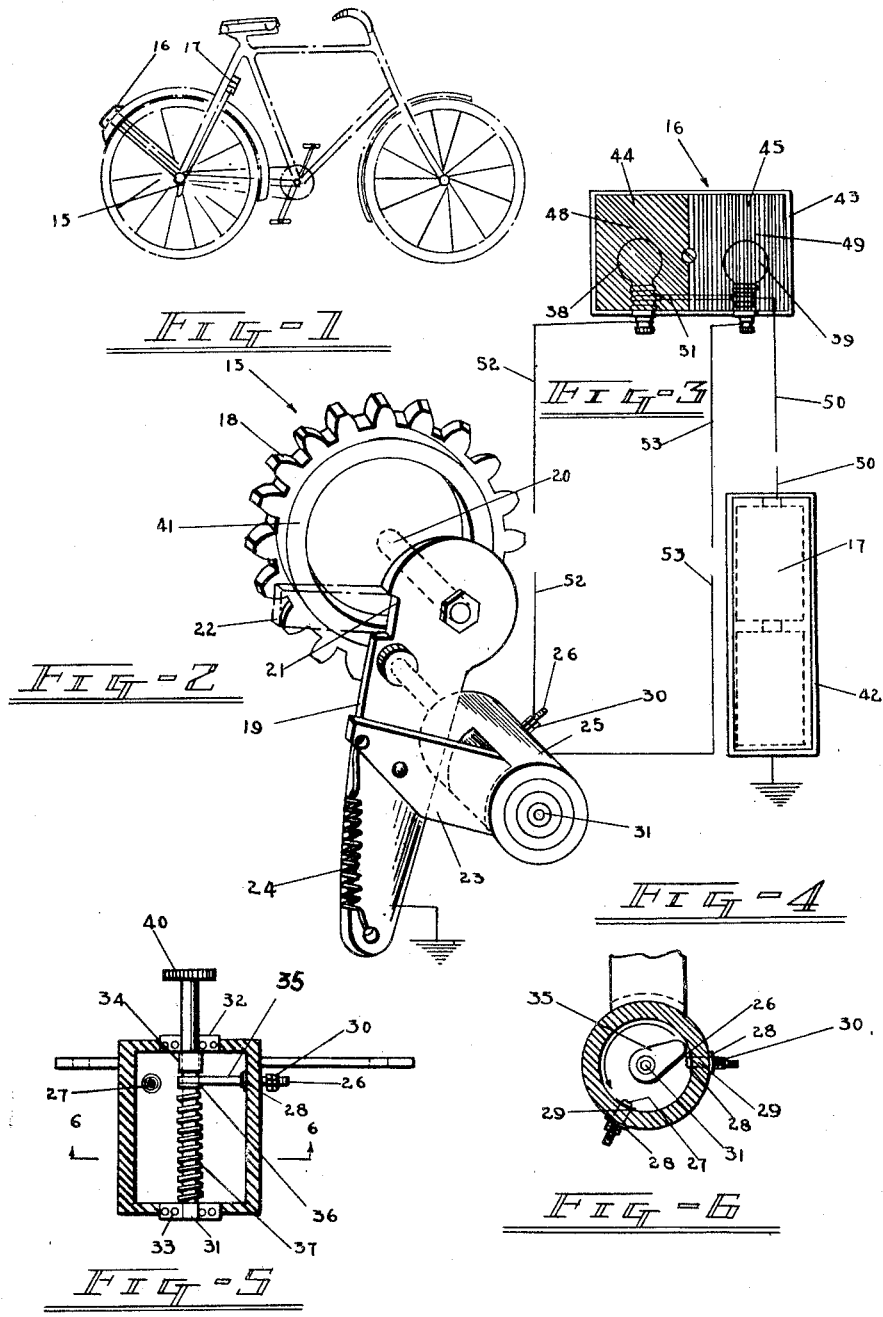
INVENTOR
George Pacurar
By Edward N. Fetherstonhaugh
ATTORNEY March 27, 1951 G. PACURAR 2,546,610
SWITCH SIGNALING MEANS
Filed June 19, 1948 2 Sheets-Sheet 2
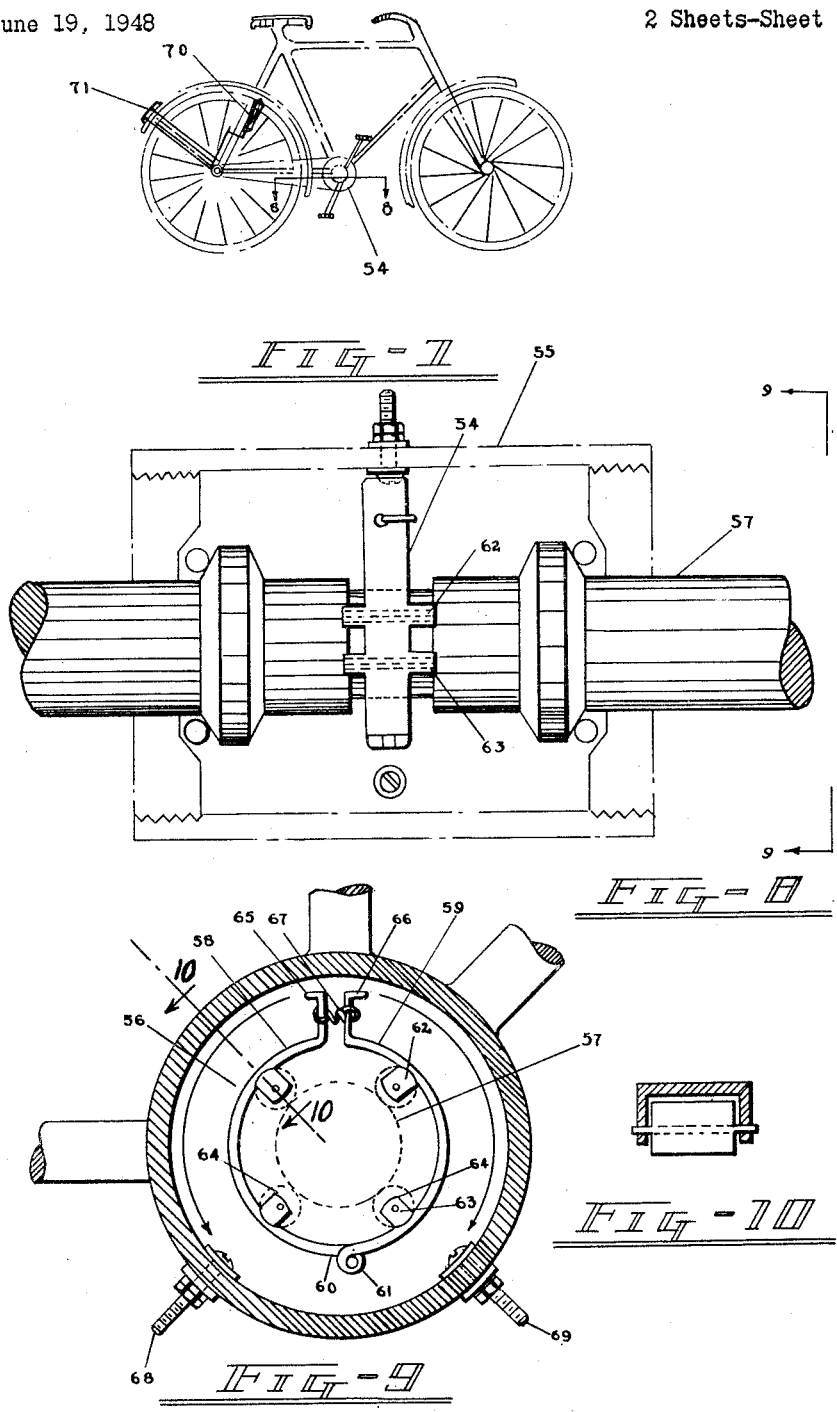
INVENTOR
George Pacurar
By Edward N. Fetherstonhaugh
ATTORNEY Patented Mar. 27, 1951

2,546,610

UNITED STATES PATENT OFFICE 2,546,610

SWITCH SIGNALING MEANS

George Pacurar, Montreal, Quebec, Canada

Application June 19, 1948, Serial No. 33,957
In Canada September 17, 1947

1 Claim. (Cl. 200—52)

The invention relates to improvements in a switch signalling means, as described in the present specification and illustrated in the accompanying drawings that form a part of the same.

The invention consists essentially of the novel features of construction as pointed out broadly and specifically in the claims for novelty following a description containing an explanation in detail of acceptable forms of the invention.

The objects of the invention are to devise a switch signalling means which will indicate forward or rearward motion of a mechanism; to indicate clockwise or counter clock-wise motion of a rotating mechanism; to furnish a switch signalling means for vehicles which will operate a "go" and "stop" device; to construct a switch signalling means particularly adapted to be mounted on a bicycle for operating a tail light on the same; to make a switch signalling device for a bicycle which will register "go" upon forward motion thereof and in which braking action on the same will change the signal to "stop"; to lessen the danger of accidents by providing vehicles with an efficient signalling means; to offer a switch signalling means simple in construction and inexpensive to manufacture; to plan a switch signalling means sufficiently sensitive to indicate forward motion of a bicycle or braking action on the latter and generally to provide a switch signalling means which will be durable, dependable and efficient for its purpose.

In the drawings:

Figure 1 is a schematic side elevation of a bicycle showing the switch mechanism for the signalling means mounted adjacent to the rear sprocket of same.

Figure 2 is an oblique perspective view showing the position of the switch and bracket with respect to the rear sprocket of a bicycle.

Figure 3 is an angularly inclined rear view of the signalling means.

Figure 4 is a vertical view of the battery case for the device.

Figure 5 is a sectional view taken through the switch.

Figure 6 is a sectional view of the switch as taken on the line 6—6 in Figure 5.

Figure 7 is a schematic side elevation of a bicycle showing the switch mechanism for the signalling means incorporated in the crank housing of same.

Figure 8 is a front view of the switch mechanism incorporated in the crank housing of a bicycle.

Figure 9 is a view taken on the line 9—9 in Figure 8 showing the switch mechanism assembled in the crank housing.

Figure 10 is a sectional view as taken on the line 10—10 in Figure 9.

Like numerals of reference indicate corresponding parts in the various figures.

The invention as hereinafter described specifically is based on its application to a bicycle and may be suitably mounted with respect to the rear sprocket or may be incorporated in the crank housing. However it will be understood that with slight modifications this switch signalling means may be adapted for use on any type of vehicle or for indicating the direction of rotation of machinery on other mechanism of any particular type.

Referring to the drawings, the switch signalling means consists of the switch or switch mechanism as indicated by the numeral 15 which forms a connection between the signalling lights 16 and the batteries 17.

The switch mechanism 15 is adapted to be suitably mounted with respect to the rear sprocket 18 of a bicycle. The support member 19 for the switch mechanism is suitably mounted on the end of the axle 20 which supports the rear wheel of the bicycle. The support member 19, in this instance, is shaped from a flat piece of metal or other suitable material and extends rearward and downward from the axle 20. The notch 21 in the outer edge of the support member 19 is adapted to be engaged by the end of the bar 22 which is suitably and fixedly secured to the frame of the bicycle, thus retaining this support member in a predetermined position with respect to the rear sprocket 18.

The bracket 23 is pivotally mounted on the support member 19 and the tension spring 24 is suitably connected to the former and to the end of this support member. The switch housing 25 is movably secured to the support member 19 by means of the bracket 23 and the tension spring 24 is adapted to determine the movement of the former with respect to this support member.

The contact points or members 26 and 27 are suitably located on the inner wall of the switch housing 25 and extend outward therethrough. The insulating washers 28 and the insulating sleeve 29 prevent contact of the screws 26 and 27 with the switch housing 25 and the same are secured substantially in position by the nuts 30.

The switch shaft 31 extends longitudinally through the switch housing 25 and is rotatably supported therein by the roller bearings 32 and 33. The sleeve 34 is fixedly secured on the shaft 31 and bears against the inner side of the bearing 32. The switch arm or switching member 35 and the washer 36 are rotatably mounted on the shaft 31 and the compression spring 37 exerts pressure between the inner side of the bearing 33 and this washer. In this respect, while the switch arm 35 is rotatably mounted on the shaft 31 the pressure of the spring 37 bearing on the washer 36 and switch arm 35 is adapted to turn the latter until the same strikes either of the contact points 26 or 27, thus illuminating the signalling light 38 or 39. When the switch arm 35 strikes either the contact point 26 or 27 it remains in contact with the same until the shaft 31 is turned in the opposite direction. In this instance, the contact is broken with one contact point and the switch arm 35 turns until it strikes the other of the contact points.

The shaft 31 has the friction wheel 40 fixedly secured on the inner end thereof and adapted to engage the ring 41 which is suitably mounted adjacent to the rear sprocket 18. The periphery of the friction wheel 40 is suitably ridged or knurled; while the ring 41 is of any suitable material such as rubber or the like which will facilitate the turning of this friction wheel.

The batteries 17 are accommodated in a suitable casing 42 and may be mounted in any convenient place on the frame of the bicycle.

The signalling lights 16 consist of a casing 43 having two compartments 44 and 45. The lamps or bulbs 38 and 39 are accommodated in the compartments 44 and 45, respectively. A green translucent cover 48 is suitably secured over the lamp 38 in compartment 44 while the red translucent cover 49 is secured over the lamp 39 in compartment 45. The complete light casing 43 is suitably located on the rear portion of the bicycle and may be mounted on the mud guard or any other convenient place.

The switch mechanism 15, signalling means 16 and the batteries 17 are suitably connected to one another by conductors. In this instance, the switch mechanism 15 and the batteries 17 are grounded on the frame of the bicycle. The conductors 50 and 51 form a connection between the batteries 17 and the lamps 38 and 39, respectively. The lamp 38, in turn, is connected to the contact point 26 on the switch mechanism 15 by the conductor 52; while the conductor 53 forms a connection between the lamp 39 and the contact point 27.

In the modification shown in Figures 7, 8, 9 and 10 the switch mechanism 54 is accommodated in the crank housing 55. The movable means 56 is mounted on the crank axle 57 of the bicycle. This movable means consists of a pair of arcuately shaped bands 58 and 59 which are connected to one another by the hinge portions 60 and 61, respectively. The bands 58 and 59 each have a pair of lugs, 62 and 63 extending inward therefrom. The rollers 64 are rotatably mounted between each pair of these lugs and the former are adapted to contact the crank axle 57. In this respect the arcuately shaped bands 58 and 59 are placed around the crank axle 57 so that each of the rollers rest on the latter. The movable means 56 is mounted on a recessed portion of the crank axle 57 in such a manner that the rollers 64 will be guided laterally with respect to the crank housing 55.

The flanges 65 and 66 are formed on the free ends of the bands 58 and 59 and are adapted to be connected together by means of the tension spring 67. This spring permits the movable means 56 to turn on the crank axle 57 and yet provides sufficient friction with respect to the same to create a tendency to turn with this crank axle.

The contact points 68 and 69 are secured in the crank housing 55 in a similar manner to that in which the contact points 26 and 27 are mounted in the switch housing 25. A forward or backward motion of the crank axle 57 is adapted to bring either of the flanges 65 or 66 in contact with the contact point 68 or 69, respectively.

The generator 70 is adapted to be operated by the wheel or tire of a bicycle and suitably connected to the switch mechanism 54 and the signalling means 71 so as to operate the latter in a similar manner to that of the signalling lights 16 as hereinbefore described.

In the operation of the invention the friction wheel 40 is rotated by the ring 41 which is fixedly mounted with respect to the rear sprocket 18. This friction wheel, in turn, rotates the shaft 31 in the switch mechanism 15. The switch arm 35 which is mounted on this shaft is adapted to turn with the same due to friction caused by the compression spring 37 until the switch arm strikes either the contact point 26 or 27. After striking either of these contact points the switch arm 35 bears on the same and at the same time permits continuous rotation of the shaft 31 therein.

As the rear sprocket 18 turns the rear wheel in a forward direction the switch arm 35 bears against the contact point 26 in the switch mechanism 15 thus illuminating the lamp 38 which is concealed by the green translucent cover 48. As the brakes are applied the rear sprocket 18 turns backward until the braking mechanism in the hub of the rear wheel is actuated. During the reverse movement of this rear sprocket ring 41 turns the friction wheel 40 and shaft 31 in an opposite direction to that of the foregoing thus turning the switch arm 35 until it strikes the contact point 27 and illuminating the lamp 39 which is concealed by the red translucent cover 49. In this respect it will be noted that the switch arm 35 forms a connection with either of the contact points 26 or 27 in such a manner that if the green signal is showing it will be shut off before the red signal appears or vice versa. In the modification shown in Figures 7, 8, 9 and 10 the operation of the switch mechanism is similar to that as hereinbefore described, with the principal difference being that the switch is incorporated in the crank housing.

It will be seen from the foregoing that a simple and efficient switch signalling means has been provided that may be used on bicycles, other vehicles, machinery mechanism and the like in various capacities and for numerous purposes.

What I claim is:

In a switch signalling means, a switch accommodated in a crank housing and being mounted on a crank axle extending through the housing, said switch comprising a pair of arcuate shaped bands connected together by hinged portions, a pair of spaced apart lugs formed on each of said bands and extending inward therefrom, rollers rotatably mounted between each of said pair of lugs and contacting the crank axle, an outwardly turned flange formed at the free end of each of said bands, a tension spring located between the said flanges of said bands and secured thereto, connecting the said flanges together in spaced apart relation, the said tension spring adapting said bands to be tensioned towards the crank axle thus maintaining the said rollers in direct frictional engagement with the crank axle and adapting the bands to turn on the crank axle while providing sufficient friction with respect to the same to tend to turn therewith, and a pair of spaced apart contact points fixedly secured on the inside face of the crank housing, one of which being contacted by the said flange on one of said bands and the other of said contact points being contacted by the flange on the other of the bands, upon rearward or forward motion respectively of the aforesaid crank axle.

GEORGE PACURAR.

REFERENCES CITED

The following references are of record in the file of this patent:

UNITED STATES PATENTS

| Number | Name | Date |
| --- | --- | --- |
| 404,867 | Ricketson | June 11, 1889 |
| 1,729,071 | Gilbert | Sept. 24, 1929 |
| 2,042,915 | Twist | June 2, 1936 |
| 2,090,805 | Oliver | Aug. 24, 1937 |
| 2,128,769 | Finnell | Aug. 30, 1938 |
| 2,222,075 | Johnston | Nov. 19, 1940 |
| 2,422,973 | Martin | June 24, 1947 |

FOREIGN PATENTS

| Number | Country | Date |
| --- | --- | --- |
| 388,214 | Great Britain | Feb. 23, 1933 |